(12) United States Patent
Viereck (10) Patent No.: US 11,279,407 B2
(45) Date of Patent: Mar. 22, 2022

(54) FRONT AXLE SUPPORTING FRAME COMPRISING A MOUNTING DEVICE FOR A DRIVE UNIT

(71) Applicant: VOLKSWAGEN AKTIENGESELLSCHAFT, Wolfsburg (DE)

(72) Inventor: Wolfgang Viereck, Isenbüttel (DE)

(73) Assignee: Volkswagen Aktiengesellschaft

( * ) Notice: Subject to any disclaimer, the term of this patent is extended or adjusted under 35 U.S.C. 154(b) by 9 days.

(21) Appl. No.: 16/762,936

(22) PCT Filed: Oct. 29, 2018

(86) PCT No.: PCT/EP2018/079591
§ 371 (c)(1),
(2) Date: May 10, 2020

(87) PCT Pub. No.: WO2019/091815
PCT Pub. Date: May 16, 2019

(65) Prior Publication Data
US 2020/0391797 A1    Dec. 17, 2020

(30) Foreign Application Priority Data

Nov. 10, 2017    (DE) ...................... 10 2017 220 095.2

(51) Int. Cl.
| | |
|---|---|
| *B62D 21/11* | (2006.01) |
| *B60K 1/00* | (2006.01) |
| *B60K 5/12* | (2006.01) |

(52) U.S. Cl.
CPC ................ *B62D 21/11* (2013.01); *B60K 1/00* (2013.01); *B60K 5/12* (2013.01); *B60K 2001/001* (2013.01)

(58) Field of Classification Search
CPC ............. B62D 21/11; B60K 1/00; B60G 5/12
See application file for complete search history.

(56) References Cited

U.S. PATENT DOCUMENTS

| | | | |
|---|---|---|---|
| 6,511,096 B1 * | 1/2003 | Kunert | ..................... B60G 7/02 |
| | | | 280/124.109 |
| 10,118,649 B2 | 11/2018 | Isakiewitsch | |

(Continued)

FOREIGN PATENT DOCUMENTS

| | | |
|---|---|---|
| DE | 19909945 C1 | 10/2000 |
| DE | 102006013550 A1 | 9/2007 |

(Continued)

OTHER PUBLICATIONS

Bui, Axle carrier of a motor vehicle, Apr. 7, 2016, EPO, DE 10 2014 220 312 A1, Machine Translation of Description (Year: 2016).*

(Continued)

*Primary Examiner* — James A English
(74) *Attorney, Agent, or Firm* — Barnes & Thornburg LLP (57) ABSTRACT

A front axle supporting frame for mounting a drive unit of a transportation vehicle including a first longitudinal beam and a second longitudinal beam which extend substantially along a longitudinal transportation vehicle axis, as well as a first cross-beam and a second cross-beam which extend substantially along a transverse transportation vehicle axis, the first cross-beam is located in front of the second cross-beam when viewed in a direction of travel. A three-point mounting device for the drive unit is provided on the cross-beams.

19 Claims, 4 Drawing Sheets

(56) References Cited

U.S. PATENT DOCUMENTS

| | | | |
|---|---|---|---|
| 2017/0057550 A1 | 3/2017 | Sasaki | |
| 2017/0217502 A1* | 8/2017 | Tenhaeff | ................. B29C 35/02 |
| 2018/0079452 A1* | 3/2018 | Kramer | ................. B62D 21/11 |
| 2019/0275872 A1* | 9/2019 | Hamel | .................... F16F 15/08 |

FOREIGN PATENT DOCUMENTS

| | | | | |
|---|---|---|---|---|
| DE | 102010027592 A1 * | 2/2011 | ............... | B60K 1/00 |
| DE | 102012103125 A1 | 10/2013 | | |
| DE | 102012012327 A1 | 12/2013 | | |
| DE | 102012105154 A1 | 12/2013 | | |
| DE | 102012025371 A1 | 7/2014 | | |
| DE | 102013011546 A1 | 1/2015 | | |
| DE | 102014220312 A1 | 4/2016 | | |
| DE | 102016000670 B3 | 1/2017 | | |
| EP | 1386827 A2 | 2/2004 | | |
| EP | 2402190 A1 | 1/2012 | | |
| EP | 2987706 A1 | 2/2016 | | |

OTHER PUBLICATIONS

Erjawetz et al., Support and Drive Arrangement, Feb. 17, 2011, EPO, DE 10 2010 027 592 A1, Machine Translation of Description (Year: 2011).*

Search Report for International Patent Application No. PCT/EP2018/079591; dated Feb. 15, 2019.

* cited by examiner

FRONT AXLE SUPPORTING FRAME COMPRISING A MOUNTING DEVICE FOR A DRIVE UNIT

PRIORITY CLAIM

This patent application is a U.S. National Phase of International Patent Application No. PCT/EP2018/079591, filed 29 Oct. 2018, which claims priority to German Patent Application No. 10 2017 220 095.2, filed 10 Nov. 2017, the disclosures of which are incorporated herein by reference in their entireties.

SUMMARY

Illustrative embodiments relate to a front axle auxiliary frame for securing a drive unit of a transportation vehicle.

BRIEF DESCRIPTION OF THE DRAWINGS

Disclosed embodiments are illustrated in greater detail below with reference to the figures. Disclosed embodiments may be significant individually per se or in any combination. In this instance, it should be noted that the figures are only of a descriptive nature and are not intended to limit the disclosed embodiments. In the drawings.

DETAILED DESCRIPTION

Front axle auxiliary frames for securing drive units in transportation vehicles are known in principle. The known front axle auxiliary frames are constructed with specific securing bearings, for example, metal/rubber/bearings, which serve to decouple the movements of the drive unit relative to the body of the transportation vehicle. During significant speed changes, for example, during start-up maneuvers or braking operations, the drive units are moved back and forth along the transportation vehicle longitudinal axis as a result of their mass inertia. With a front transverse motor arrangement of the drive units, this leads to oscillating movements of the drive units about a transportation vehicle transverse axis. Consequently, in the bearing of the drive units, it is important to absorb and damp the oscillating movements of the drive unit about a transportation vehicle transverse axis. Furthermore, the bearing of the drive unit has an influence on the driving safety, on travel comfort and on the service-life of the chassis, bearing and body components. In addition, as a result of incorrect bearing of the drive unit, disruptive noises may occur.

An exemplary front axle auxiliary frame is known from DE 10 2016 000 670 B3 which forms a frame-like auxiliary frame with two longitudinal carriers and two transverse carriers. At the corner locations of the auxiliary frame, a four-point bearing for the drive unit is provided. However, it has been found to be a benefit that the four-point bearing is excessively overdetermined for a technical vibration decoupling of the drive unit from the body, at least in the horizontal plane. With such a four-point bearing, oscillating movements of the drive unit can only be absorbed about the transportation vehicle transverse axis. To this end, the front two bearings have to be orientated precisely parallel with the transportation vehicle transverse axis and have to have precisely the same spacing with respect to the rear bearings. The rear bearings must also have precisely parallel axes. Otherwise, already small securing tolerances may lead to oscillating movements of the drive unit which cannot be absorbed by the bearings being produced.

Consequently, disclosed embodiments at least partially overcome at least one known drawback from the prior art. Disclosed embodiments provide a front axle auxiliary frame for securing a drive unit of a transportation vehicle, which has a simple and compact structure and which is suitable for absorbing and reducing the oscillations of the drive unit, in particular, along the transportation vehicle longitudinal axis, and oscillating movements of the drive unit, in particular, about the transportation vehicle transverse axis. Furthermore, disclosed embodiments provide a front axle auxiliary frame for securing a drive unit of a transportation vehicle with such a bearing, which decouples the drive unit in technical vibration terms from the transportation vehicle body.

The above is achieved with a front axle auxiliary frame for securing a drive unit of a transportation vehicle Features which are disclosed relating to the individual exemplary embodiments of the disclosed front axle auxiliary frame can be combined with each other in such a manner that reference may always be made with regard to the disclosure relating to the exemplary embodiments.

The disclosed embodiments provide for a front axle auxiliary frame for securing a drive unit of a transportation vehicle, having a first longitudinal carrier and a second longitudinal carrier which are orientated substantially along a transportation vehicle longitudinal axis, a first transverse carrier and a second transverse carrier which are orientated substantially along a transportation vehicle transverse axis, wherein the first transverse carrier is arranged in front of the second transverse carrier when viewed in a travel direction. To this end, there is provision for a three-point bearing to be provided on the transverse carriers for the drive unit.

An exemplary drive unit may be an electric drive unit, in particular, a drive unit which can be operated in an auxiliary manner. The disclosed transportation vehicle may be an electric transportation vehicle, which may be configured with an electric rear drive as a main drive. The disclosed front axle auxiliary frame may form a frame-like auxiliary frame.

The disclosed embodiment in this instance involves a three-point bearing being provided on the frame-like front axle auxiliary frame to support the drive unit and to decouple it optimally from the transportation vehicle body in technical vibration terms. A three-point bearing can form a plane in which oscillations of the drive unit are absorbed in any direction which extends through two bearings. Furthermore, as a result of a three-point bearing, oscillating movements can be absorbed about any direction which extends through two bearings. In this instance, the bearings do not necessarily have to be positioned in a tolerance-free manner at precise locations since three points always form a plane. Optionally, this plane may be located in the horizontal plane. With the disclosed three-point bearing, it is further conceivable for two bearings to be arranged on the first or front transverse carrier and one bearing to be arranged on the second or rear transverse carrier. It is thereby possible for oscillating movements of the drive unit about a transportation vehicle transverse axis or about the axle which extends through the front two bearings, in particular, during start-up maneuvers, to be absorbed by the rear bearing. At the front, for example, two bearing bushes and at the rear a pot bearing, a conical bearing or a round bearing may be provided. For each bearing, a specific bearing receiving member may be provided in the respective transverse carrier. On each bearing, a special support for the drive unit may further be fitted. The bearing bushes at the front may be pressed or screwed into the first transverse carrier. The front transverse carrier also has in addition to the function of the bearing receiving member the function of strengthening the front axle auxiliary frame in the transportation vehicle transverse direction. Furthermore, the front transverse carrier may act as a receiving member of an air-conditioning compressor. The air-conditioning compressor may in this instance be secured between the bearing bushes. The first transverse carrier may be secured to the front axle auxiliary frame at the height of and close to the auxiliary frame securing blocks with respect to the transportation vehicle body, that is to say, at locations where the front axle auxiliary frame is the stiffest. The rear bearing may be secured or screwed to the second or rear transverse carrier. The rear transverse carrier, in addition to the function of the bearing receiving member, also has the function of stiffening the front axle auxiliary frame in the transportation vehicle transverse direction. The rear transverse carrier may further perform the function of receiving consumer lines, such as, for example, for water and/or electric power and directing them in an at least partially protected manner. In addition, corresponding pumps and valves for consumer lines may be secured to the rear transverse carrier. For the consumer lines, the rear transverse carrier may have corresponding guides and/or holes. With the disclosed three-point bearing, it is possible in the front transverse carrier to configure various orientations of the bearings, for example, along a longitudinal, a transverse or a vertical axis of the transportation vehicle. Consequently, there may be provided an improved front axle auxiliary frame for securing the drive unit which has a simple and compact structure and which is suitable for absorbing and reducing the vibrations and oscillating movements of the drive unit in different directions in an optimum manner so that the drive unit can be decoupled in technical vibration terms from the transportation vehicle body.

Furthermore, in a disclosed front axle auxiliary frame, provision is made for the first transverse carrier to be secured to the longitudinal carriers with respect to a transportation vehicle vertical axis at the same height as and adjacent to securing bushes of the front axle auxiliary frame with respect to a transportation vehicle body. Consequently, the first transverse carrier may be fitted to a stiffest location of the front axle auxiliary frame with respect to the transportation vehicle body, whereby the force distribution between the front axle auxiliary frame and the transportation vehicle body can be improved as a result of speed changes, for example, with start-up maneuvers or braking operations, or even in the event of a crash.

Furthermore, in a disclosed front axle auxiliary frame, provision is made for the first transverse carrier to be arranged higher with respect to a transportation vehicle vertical axis than the second transverse carrier. The rear transverse carrier can thereby be placed lower, in particular, at locations where, for example, in the foot space of the transportation vehicle there is not a large amount of space available along the transportation vehicle vertical axis. The drive unit may in this instance be supported virtually in a suspended manner on the front two bearings and be supported in an oscillating manner on the rear bearing. Consequently, specific oscillating movements about the axis which extends through the front two bearings may further be enabled. By permitting specific oscillating movements, they can be absorbed in a selective manner by the bearings, as unpredictable oscillating movements resulting from unintentionally incorrectly adjusted bearing positioning.

Furthermore, in disclosed a front axle auxiliary frame, provision is made for the first transverse carrier to be constructed to receive an air-conditioning compressor. Consequently, the functionality of the first transverse carrier can be expanded. The first transverse carrier can consequently be used not only to reinforce the front axle auxiliary frame and to support the drive unit, but also to carry the air-conditioning compressor. The structural space in the front of the transportation vehicle can thereby further be used.

Furthermore, in a disclosed front axle auxiliary frame, provision is made for the first transverse carrier to have at least one, optionally integrally formed receiving bush for an air-conditioning compressor. Consequently, the assembly of the air-conditioning compressor on the first transverse carrier can be facilitated. Consequently, during pre-assembly a complete front axle auxiliary frame which carries the drive unit and the air-conditioning compressor may already be provided. The assembly of the transportation vehicle can consequently be considerably facilitated and take less time.

Furthermore, in a disclosed front axle auxiliary frame, provision is made for the second transverse carrier to be constructed to receive at least one consumer line, such as, for example, a water line and/or a power line, a pump or a valve. Consequently, the functionality of the second transverse carrier can be expanded. The second transverse carrier can consequently be used not only to reinforce the front axle auxiliary frame along a transportation vehicle transverse axis and to support the drive unit, but also to receive and guide consumer lines and to receive corresponding pumps and valves. The consumer lines can consequently be laid in a partially protected state on the second transverse carrier and no longer in a freely suspended manner. The structural space in the front of the transportation vehicle can thereby further be used.

Furthermore, in a disclosed front axle auxiliary frame, provision is made for the second transverse carrier to have at least one, optionally integrally formed guide for at least one consumer line. Consequently, the laying of the consumer line on the second transverse carrier can be facilitated and the fitter can be intuitively guided. In addition, it is consequently possible already during pre-assembly to provide a complete front axle auxiliary frame which carries the drive unit and the consumer line. The assembly of the transportation vehicle can consequently be considerably facilitated and furthermore take up less time.

Furthermore, in a disclosed front axle auxiliary frame, provision is made for the first transverse carrier to have a first bearing receiving member for receiving a first bearing and a second bearing receiving member for receiving a second bearing which are constructed to support the drive unit on the front axle auxiliary frame. Consequently, the preassembly of the drive unit on the front axle auxiliary frame may be simplified.

Furthermore, in a disclosed front axle auxiliary frame, provision is made for the first bearing receiving member and the second bearing receiving member of the first transverse carrier to be constructed in a sleeve-like manner as bearing bushes. In the sleeve-like bearing receiving members, securing bushes of the drive unit can be received, for example, pressed or screwed.

Furthermore, in a disclosed front axle auxiliary frame, provision is made for the first bearing receiving member and the second bearing receiving member to be secured to the first transverse carrier in a positive-locking and/or non-positive-locking manner. It is conceivable in this instance for the bearing receiving members to be produced separately and to be able to be secured subsequently to the first transverse carrier. Consequently, even conventional transverse carriers can be retrofitted. Alternatively, it is conceivable for the first bearing receiving member and the second bearing receiving member in the first transverse carrier to be able to be formed in a materially integral and/or monolithic manner, in particular, as a common injection-molded component. Consequently, the absorption of oscillations within the bearings can be carried out without specific play between the bearing receiving members and the transverse carriers being able to promote the production of disruptive noises.

Furthermore, in a disclosed front axle auxiliary frame, provision is made for a first bearing of the drive unit to be pressed and/or screwed in a first bearing receiving member and for a second bearing of the drive unit to be pressed and/or screwed in a second bearing receiving member. Consequently, a simple and rapid assembly of the bearings within the bearing receiving members can be achieved. With pressed bearings within the bearing receiving members, it may be beneficial for the propagation of disruptive noises, for example, rattling noises, to be carried out between the bearings and the bearing receiving members as a result of securing tolerances.

Furthermore, in a disclosed front axle auxiliary frame, provision is made for a first bearing and a second bearing of the drive unit to be constructed as securing bushes, as metal/rubber bearings or as a resilient bearing. The rubber or the spring within the bearings may be used to damp oscillations. With the bearings, it is further conceivable for specific stops to be able to be provided on the bearings in the oscillation receiving direction.

Furthermore, in a disclosed front axle auxiliary frame, provision is made for the three-point bearing to be constructed in such a manner that a first bearing receiving member and a second bearing receiving member for supporting the drive unit on the front axle auxiliary frame to be able to be selectively orientated along a transportation vehicle longitudinal axis, along a transportation vehicle transverse axis and along a transportation vehicle vertical axis. As a result of the disclosed three-point bearing, it is possible to carry out a flexible, model-specific orientation of the front bearings. As a result of an orientation of the front bearings along the transportation vehicle longitudinal axis, the oscillations of the drive unit along the transportation vehicle longitudinal axis can be received directly in the front bearings. With an orientation of the front bearings along the transportation vehicle transverse axis, the oscillations of the drive unit along the transportation vehicle longitudinal axis can be absorbed as oscillating movements in the region of the third bearing. With an orientation of the bearings along the transportation vehicle vertical axis, the oscillations of the drive unit along the transportation vehicle longitudinal axis can be distributed over the front bearing and the rear bearing.

Furthermore, the disclosure with a front axle auxiliary frame may make provision for the second transverse carrier to have a third bearing receiving member for supporting the drive unit on the front axle auxiliary frame, wherein the third bearing receiving member is constructed to receive a third bearing, such as a pot bearing, a conical bearing or a round bearing. Such a bearing assists in this instance in absorbing oscillations in different directions and directing them into the bearing receiving member. Furthermore, such a bearing is suitable for receiving shearing forces, whereby any securing and/or production tolerances can be compensated for. It is further conceivable for the third bearing receiving member to be formed integrally with the second transverse carrier or to form a portion of the second transverse carrier on which the third bearing can be secured, for example, in a positive-locking and/or non-positive-locking manner.

It is additionally possible for a third bearing receiving member of the second transverse carrier for supporting the drive unit on the front axle auxiliary frame to be orientated along a transportation vehicle vertical axis. It is thereby possible for the weight of the drive unit to be introduced into the second transverse carrier.

In the figures below, identical reference numerals are used for identical technical features, even of exemplary embodiments which are different.

Figure 1:
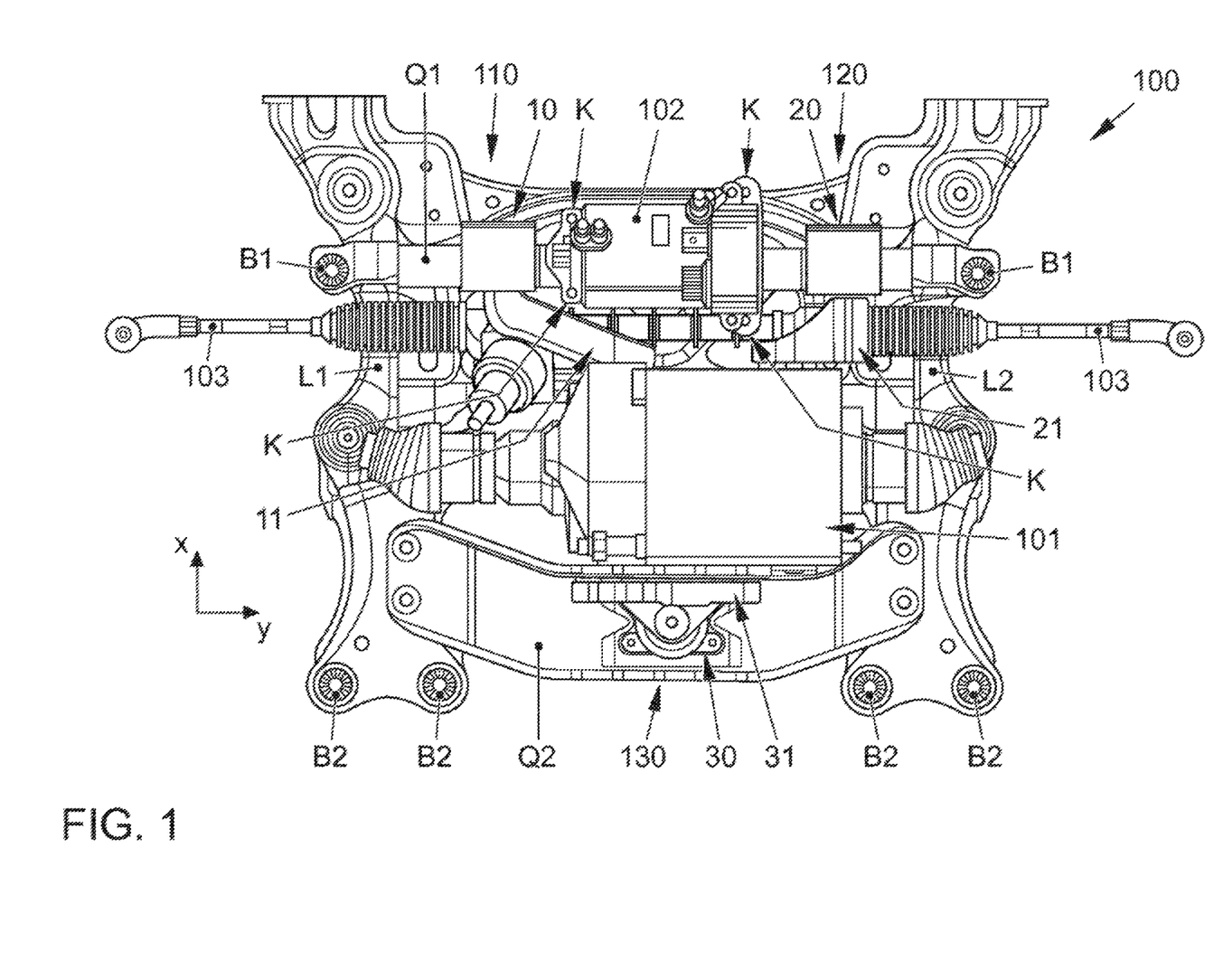
FIG. 1 is a plan view of an exemplary front axle auxiliary frame with a drive unit.
Figure 2:
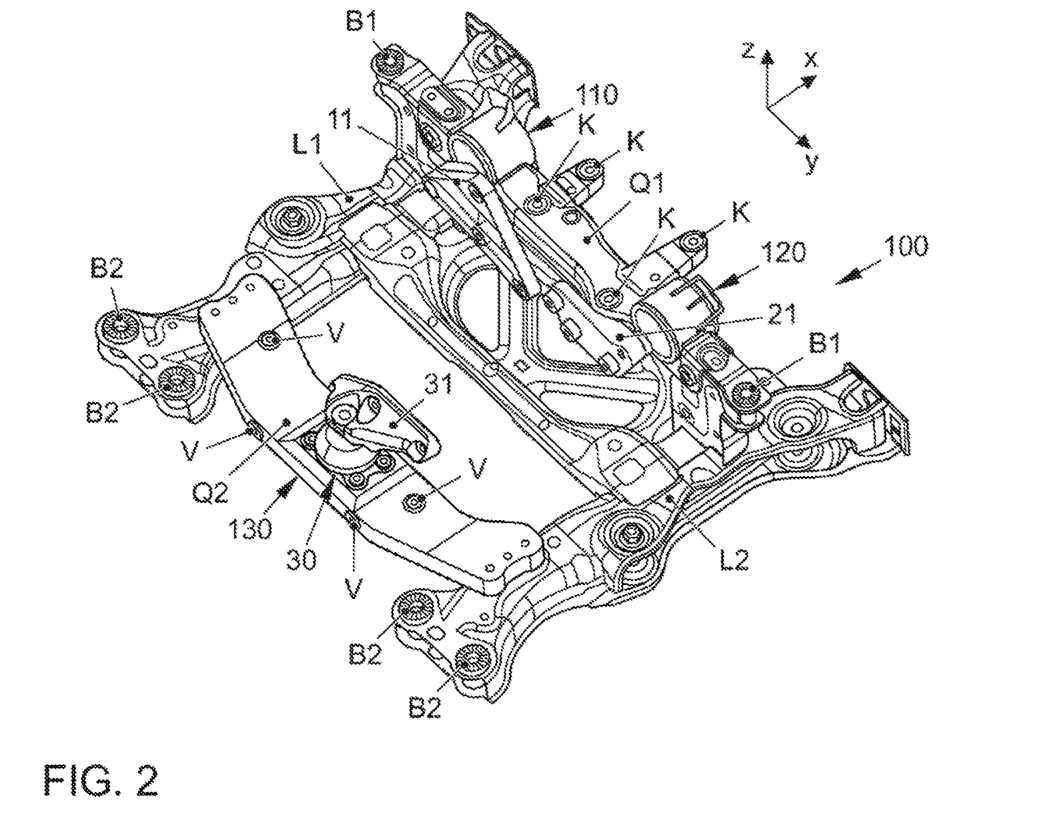
FIG. 2 is a perspective illustration of an exemplary front axle auxiliary frame without the drive unit.

FIGS. 1 and 2 show a front axle auxiliary frame 100 which serves to secure a drive unit 101 of a transportation vehicle. The drive unit 101 shown may be an electric drive unit 101, in particular, a drive unit 101 which can be operated in an auxiliary manner and which is installed in the front of the transportation vehicle and which in the alternative is operated to form a main drive unit which is installed in the rear of the transportation vehicle. Consequently, the transportation vehicle is an electric transportation vehicle. As FIGS. 1 and 2 further clarify, the front axle auxiliary frame 100 forms a frame-like structure substantially, such as a rectangle. In this instance, the front axle auxiliary frame 100 is constructed with a first longitudinal carrier L1 and a second longitudinal carrier L2 which are orientated substantially along a transportation vehicle longitudinal axis x, and with a first transverse carrier Q1 and a second transverse carrier Q2 which are orientated substantially along a transportation vehicle transverse axis y. The first transverse carrier Q1 is located when viewed in a travel direction +x in front of the second transverse carrier Q2. A three-point bearing 110, 120, 130 for the drive unit 101 is provided on the transverse carriers Q1, Q2.

The disclosed three-point bearing 110, 120, 130 serves to support the drive unit 101 and to decouple it in an optimum manner in technical vibration terms from the transportation vehicle body which is not illustrated. In the event of significant speed changes, for example, during start-up maneuvers or braking operations, the drive unit 101 as a result of its mass inertia is moved forward or backward along the transportation vehicle longitudinal axis x. In this instance, the drive unit 101 can pivot at least about the transportation vehicle transverse axis y. With an unfavorable bearing, vibrations may be produced about other geometric axes. As a result of the disclosed three-point bearing 110, 120, 130, oscillations of the drive unit 101 with respect to the transportation vehicle body during operation of the transportation vehicle can be absorbed in an optimum manner about different geometric axes, but at least about the transportation vehicle transverse axis y.

Figure 3A:
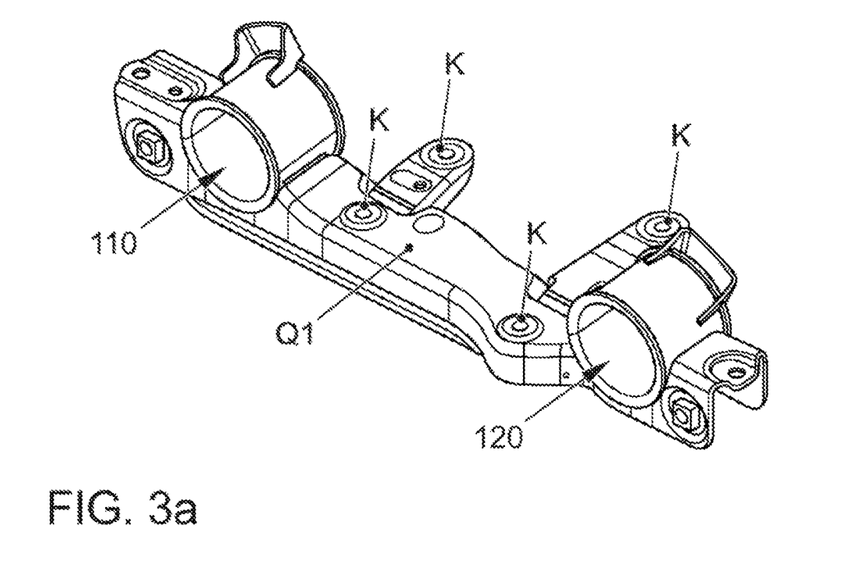
FIG. 3a is a perspective illustration of a first transverse carrier for an exemplary front axle auxiliary frame.

The front two bearings 10, 20 for the drive unit 101 which may, for example, be constructed as bearing bushes, as shown in FIG. 3a, may be secured to the first transverse carrier Q1, for example, screwed or pressed directly in the first transverse carrier Q1. To this end, corresponding, for example, sleeve-like bearing receiving members 110, 120 may be provided on the first transverse carrier Q1. The front bearing receiving members 110, 120 may in turn be secured or screwed to the first transverse carrier Q1 or constructed directly in the first transverse carrier Q1, for example, formed directly with the first transverse carrier Q1.

Figure 3B:
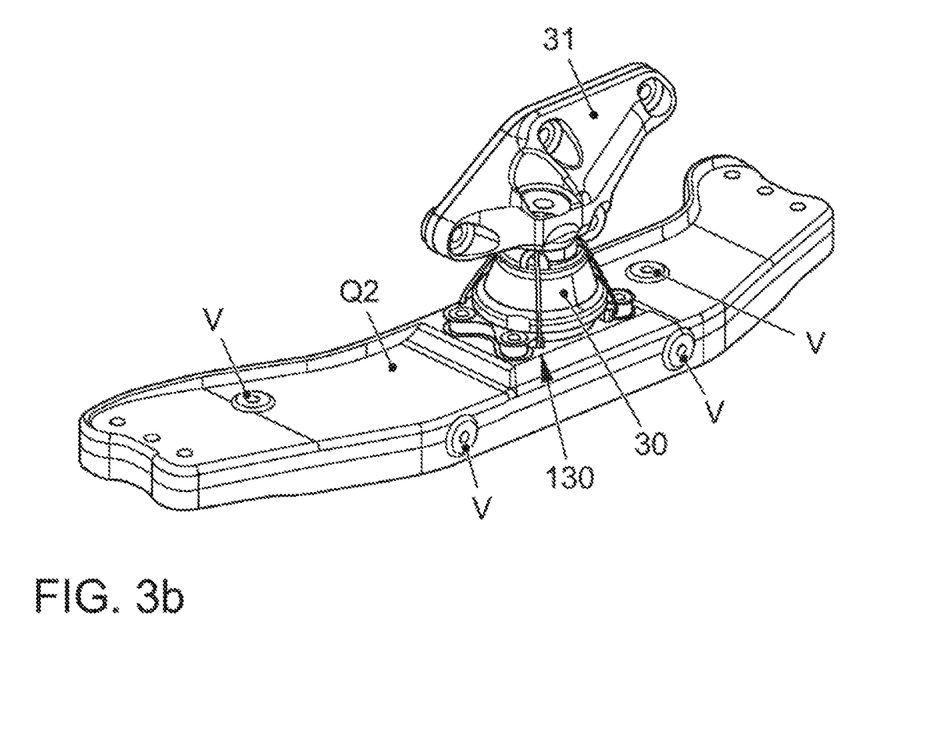
FIG. 3b is a perspective illustration of a second transverse carrier for an exemplary front axle auxiliary frame.

The rear bearing 30 may be orientated vertically along a transportation vehicle vertical axis z and be constructed, for example, as a pot bearing, a conical bearing or a round bearing, as shown in FIG. 3b. To this end, a third bearing receiving member 130 may be constructed which, for example, may form a part-portion of the second transverse carrier Q2. The third bearing 30 can consequently be screwed directly to the second transverse carrier Q2.

On each bearing receiving member 110, 120, 130, a special support 11, 21, 31 may further be provided for the respective bearing 10, 20, 30 of the drive unit 101.

As further shown in FIG. 1, the first transverse carrier Q1 may be constructed to receive an air-conditioning compressor 102. To this end, the first transverse carrier Q1 may have at least one, in particular, four, optionally integrally formed receiving bushes K. Consequently, the assembly of the air-conditioning compressor 102 in the front of the transportation vehicle can be facilitated and already be completed during pre-assembly. In the view of FIG. 1, between the drive unit 101 and the air-conditioning compressor 102, a coupling rod 103 can be identified for the wheels (not illustrated) of the transportation vehicle.

FIG. 2 further indicates that the second transverse carrier Q2 may be constructed to receive at least one consumer line which is not illustrated, such as, for example, a water line, a power line, and a pump or a valve. To this end, the second transverse carrier Q2 may have at least one integrally formed guide V for the at least one consumer line. Consequently, the assembly of the transportation vehicle in the front of the transportation vehicle may be considerably simplified.

Furthermore, the functionality of the first transverse carrier Q1 and the second transverse carrier Q2 can consequently be expanded. The two transverse carriers Q1, Q2 can consequently be used not only to reinforce the front axle auxiliary frame 100 in the transportation vehicle transverse direction and to support the drive unit 101, but also to receive an air-conditioning compressor 102 and required consumer lines. The structural space in the front of the transportation vehicle can thereby further be used.

Figure 4:
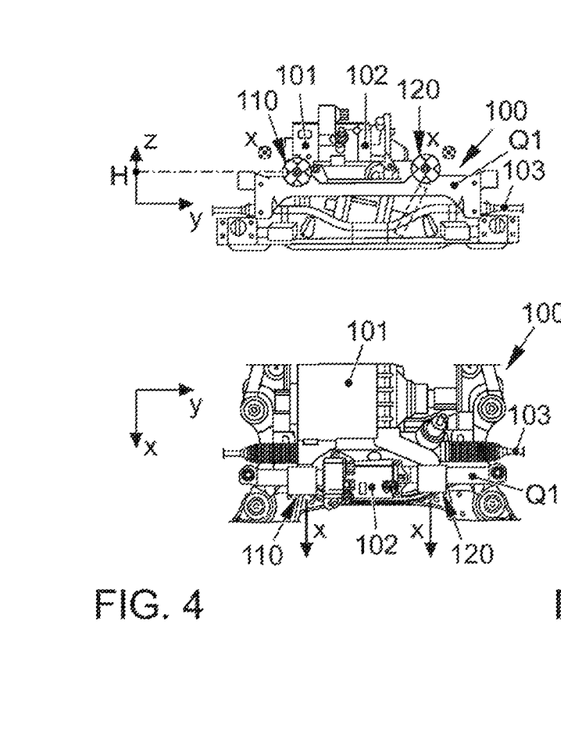
FIG. 4 shows an exemplary embodiment of a disclosed front axle auxiliary frame.
Figure 5:
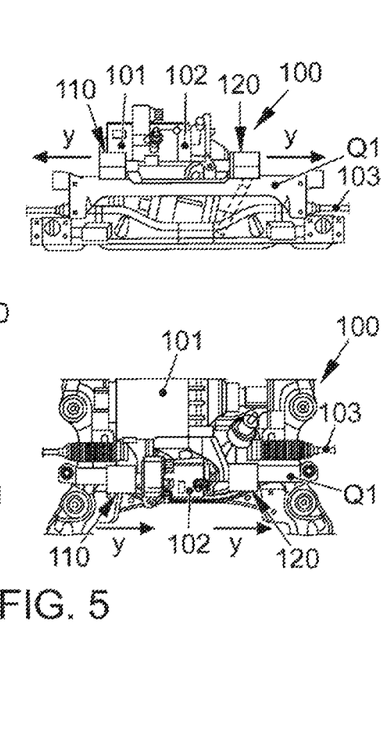
FIG. 5 shows another exemplary embodiment of a disclosed front axle auxiliary frame.
Figure 6:
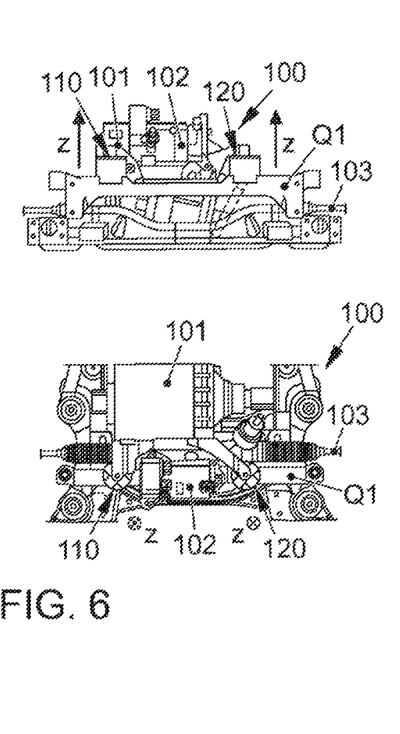
FIG. 6 shows another exemplary embodiment of a disclosed front axle auxiliary frame.

Using the disclosed three-point bearing 110, 120, 130, the front two bearings 10, 20 can optionally be orientated selectively along a transportation vehicle longitudinal axis x, along a transportation vehicle transverse axis y or along a transportation vehicle vertical axis z, as shown successively in FIGS. 4, 5 and 6.

FIG. 4 shows an exemplary embodiment of the disclosed front axle auxiliary frame 100 having an orientation of the front two bearings 10, 20 along the transportation vehicle longitudinal axis x. In this instance, the vibrations of the drive unit 101 along the transportation vehicle longitudinal axis x can be directly compensated for in the front bearings 10, 20.

FIG. 5 shows an exemplary embodiment of the disclosed front axle auxiliary frame 100 having an orientation of the front two bearings 10, 20 along the transportation vehicle transverse axis y. In this instance, the vibrations of the drive unit 101 along the transportation vehicle longitudinal axis x can be compensated for on the third bearing 30 as oscillating movements about the transportation vehicle transverse axis y which extends substantially through the front two bearings 10, 20.

FIG. 6 shows an exemplary embodiment of the disclosed front axle auxiliary frame 100 having an orientation of the front two bearings 10, 20 along the transportation vehicle vertical axis z. In this instance, the vibrations of the drive unit 101 along the transportation vehicle longitudinal axis x can be compensated for as oscillating movements about the transportation vehicle transverse axis y both on the front two bearings 10, 20 and on the third rear bearing 30.

Depending on the transportation vehicle model and customer wishes, one or other exemplary embodiment according to one of FIGS. 4 to 6 may be beneficial.

As FIGS. 4 to 6 show in the upper view, the first transverse carrier Q1 may be secured to the longitudinal carriers L1, L2 with respect to the transportation vehicle vertical axis z at the same height H as and adjacent to securing bushes B1 of the front axle auxiliary frame 100 with respect to a transportation vehicle body, which corresponds to a stiffest location of the front axle auxiliary frame 100 with respect to the transportation vehicle body. Behind the second transverse carrier Q2, additional securing bushes B2 may be provided between the longitudinal carriers L1, L2 and the transportation vehicle body.

As can be seen in FIG. 2 and FIGS. 4 to 6 in the lower view, the first transverse carrier Q1 can be arranged higher with respect to the transportation vehicle vertical axis z than the second transverse carrier Q2. In the front of the transportation vehicle, this may be beneficial since the structural space is very limited there in the foot region of the user.

The above description of the figures describes the disclosure exclusively in the context of examples. Of course, individual features of the exemplary embodiments, wherever it is technically beneficial, can be freely combined with each other without departing from the scope of the disclosure.

LIST OF REFERENCE NUMERALS

100 Front axle auxiliary frame
101 Drive unit
102 Air-conditioning compressor
103 Coupling rod
110 First bearing receiving member
120 Second bearing receiving member
130 Third bearing receiving member
Q1 First transverse carrier
Q2 Second transverse carrier
L1 First longitudinal carrier
L2 Second longitudinal carrier
10 First bearing
11 Support
20 Second bearing
21 Support
30 Third bearing
31 Support
B1 Securing bush
B2 Securing bush
H Height
K Receiving bush for an air-conditioning compressor
V Guide for at least one consumer line
x Transportation vehicle longitudinal axis
y Transportation vehicle transverse axis
z Transportation vehicle vertical axis

The invention claimed is:

1. A front axle auxiliary frame for securing a drive unit of a transportation vehicle, the front axle auxiliary frame comprising:

a first longitudinal carrier and a second longitudinal carrier orientated substantially along a transportation vehicle longitudinal axis; and a first transverse carrier and a second transverse carrier orientated substantially along a transportation vehicle transverse axis;

wherein the first transverse carrier is arranged in front of the second transverse carrier when viewed in a travel direction, wherein a three-point bearing is provided on the transverse carriers for the drive unit, wherein the three-point bearing includes a first bearing receiving member arranged on the first transverse carrier for receiving a first bearing and a second bearing receiving member arranged on the first transverse carrier for receiving a second bearing, wherein the first bearing receiving member and the second bearing receiving member each have a cylindrical shape and a central axis that extends along a length of the cylindrical shape, and wherein the first transverse carrier is secured to the longitudinal carriers with respect to a transportation vehicle vertical axis adjacent to securing bushes of the front axle auxiliary frame with respect to a transportation vehicle body such that the central axis of the first bearing receiving member and the central axis of the second bearing receiving member are coplanar with a top surface of the securing bushes of the front axle auxiliary frame.

2. The front axle auxiliary frame of claim 1, wherein the first transverse carrier is constructed to receive an air-conditioning compressor.

3. The front axle auxiliary frame of claim 1, wherein the first transverse carrier has at least one receiving bush for an air-conditioning compressor.

4. The front axle auxiliary frame of claim 1, wherein the second transverse carrier receives at least one consumer line, a water line, a power line, a pump or a valve.

5. The front axle auxiliary frame of claim 1, wherein the second transverse carrier has at least one guide for at least one consumer line.

6. The front axle auxiliary frame of claim 1, wherein the first bearing receiving member and the second bearing receiving member are constructed to support the drive unit on the front axle auxiliary frame, and wherein the first bearing receiving member and the second bearing receiving member of the first transverse carrier are constructed as bearing bushes to provide a sleeved interaction.

7. The front axle auxiliary frame of claim 6, wherein the first bearing of the drive unit is pressed in the first bearing receiving member and the second bearing of the drive unit is pressed in the second bearing receiving member.

8. The front axle auxiliary frame of claim 1, wherein the three-point bearing is constructed so that the first bearing receiving member and the second bearing receiving member for supporting the drive unit on the front axle auxiliary frame are selectively orientated along a transportation vehicle longitudinal axis, along a transportation vehicle transverse axis or along a transportation vehicle vertical axis.

9. The front axle auxiliary frame of claim 1, wherein the second transverse carrier has a third bearing receiving member of the three-point bearing for supporting the drive unit on the front axle auxiliary frame, wherein the third bearing receiving member is constructed to receive a third bearing, which is a pot bearing, a conical bearing or a round bearing.

10. The front axle auxiliary frame of claim 9, wherein the third bearing receiving member is arranged centrally along a length of the second transverse that extends in a direction from the first longitudinal carrier and the second longitudinal carrier.

11. The front axle auxiliary frame of claim 6, wherein the central axis of the first bearing receiving member and the central axis of the second receiving member are parallel with the transportation vehicle longitudinal axis such that oscillations of the drive unit along the transportation vehicle longitudinal axis are received directly by the first bearing receiving member and the second bearing receiving member.

12. A front axle auxiliary frame for securing a drive unit of a transportation vehicle, the front axle auxiliary frame comprising:

a first longitudinal carrier and a second longitudinal carrier orientated substantially along a transportation vehicle longitudinal axis; and a first transverse carrier and a second transverse carrier orientated substantially along a transportation vehicle transverse axis;

wherein the first transverse carrier is arranged in front of the second transverse carrier when viewed in a travel direction, wherein a three-point bearing is provided on the transverse carriers for the drive unit, wherein the first transverse carrier has a first bearing receiving member for receiving a first bearing and a second bearing receiving member for receiving a second bearing, which are constructed to support the drive unit on the front axle auxiliary frame, wherein the second transverse carrier has a third bearing receiving member for supporting the drive unit, and wherein the first bearing receiving member and the second bearing receiving member each have a cylindrical shape and a central axis that extends along a length of the cylindrical shape, the central axis of each of the first and second receiving members being parallel with the transportation vehicle transverse axis such that oscillations of the drive unit along the transportation vehicle longitudinal axis are absorbed as oscillating movements in a region of the third bearing receiving member.

13. A front axle auxiliary frame for securing a drive unit of a transportation vehicle, the front axle auxiliary frame comprising:

a first longitudinal carrier and a second longitudinal carrier orientated substantially along a transportation vehicle longitudinal axis; and a first transverse carrier and a second transverse carrier orientated substantially along a transportation vehicle transverse axis;

wherein the first transverse carrier is arranged in front of the second transverse carrier when viewed in a travel direction, wherein a three-point bearing is provided on the transverse carriers for the drive unit, wherein the first transverse carrier has a first bearing receiving member for receiving a first bearing and a second bearing receiving member for receiving a second bearing, which are constructed to support the drive unit on the front axle auxiliary frame, wherein the second transverse carrier has a third bearing receiving member for supporting the drive unit, and wherein the first bearing receiving member and the second bearing receiving member each have a cylindrical shape and a central axis that extends along a length of the cylindrical shape, the central axis of each of the first and second receiving members being parallel with a transportation vehicle vertical axis that is perpendicular to the transportation vehicle longitudinal axis and the transportation vehicle transverse axis such that oscillations of the drive unit along the transportation vehicle longitudinal axis are distributed over the first bearing receiving member, the second bearing receiving member, and the third bearing receiving member.

14. The front axle auxiliary frame of claim 12, wherein the first transverse carrier is secured to the longitudinal carriers with respect to a transportation vehicle vertical axis at the same height as and adjacent to securing bushes of the front axle auxiliary frame with respect to a transportation vehicle body.

15. The front axle auxiliary frame of claim 13, wherein the first transverse carrier is secured to the longitudinal carriers with respect to a transportation vehicle vertical axis at the same height as and adjacent to securing bushes of the front axle auxiliary frame with respect to a transportation vehicle body.

16. The front axle auxiliary frame of claim 12, wherein the first transverse carrier has at least one receiving bush for an air-conditioning compressor.

17. The front axle auxiliary frame of claim 13, wherein the first transverse carrier has at least one receiving bush for an air-conditioning compressor.

18. The front axle auxiliary frame of claim 12, wherein a first bearing of the drive unit is pressed in a first bearing receiving member and a second bearing of the drive unit is pressed in a second bearing receiving member.

19. The front axle auxiliary frame of claim 13, wherein a first bearing of the drive unit is pressed in a first bearing receiving member and a second bearing of the drive unit is pressed in a second bearing receiving member.

* * * * *